United States Patent
Swartling

(10) Patent No.: US 8,532,891 B2
(45) Date of Patent: Sep. 10, 2013

(54) SYSTEM FOR CONTROL OF GEARSHIFT POINTS

(75) Inventor: Fredrik Swartling, Södertälje (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 13/391,464

(22) PCT Filed: Sep. 10, 2010

(86) PCT No.: PCT/SE2010/050959
§ 371 (c)(1),
(2), (4) Date: Feb. 21, 2012

(87) PCT Pub. No.: WO2011/031217
PCT Pub. Date: Mar. 17, 2011

(65) Prior Publication Data
US 2012/0150400 A1    Jun. 14, 2012

(30) Foreign Application Priority Data
Sep. 14, 2009  (SE) ...................... 0950658

(51) Int. Cl.
*G06F 7/00* (2006.01)
*G06F 17/00* (2006.01)
*G06F 19/00* (2011.01)

(52) U.S. Cl.
USPC ............... 701/55; 701/51; 477/120; 477/904; 700/28; 700/40

(58) Field of Classification Search
USPC ................. 701/55, 56, 57, 58, 59, 60, 64, 65, 701/66, 51; 700/28–55; 477/115, 120, 129, 477/904
See application file for complete search history.

(56) References Cited

U.S. PATENT DOCUMENTS

| 4,638,690 A | 1/1987 | Hattori et al. |
| 4,996,893 A * | 3/1991 | Nakamura et al. ............ 477/120 |

(Continued)

FOREIGN PATENT DOCUMENTS

| DE | 35 39 684 A1 | 5/1986 |
| EP | 0 574 664 A1 | 12/1993 |

(Continued)

OTHER PUBLICATIONS

International Search Report dated Dec. 9, 2010, issued in corresponding international application No. PCT/SE2010/050959.

(Continued)

*Primary Examiner* — Thomas Tarcza
*Assistant Examiner* — Rami Khatib
(74) *Attorney, Agent, or Firm* — Ostrolenk Faber LLP

(57) ABSTRACT

A system for control of one or more gearshift points, including at least one control unit for controlling a gearbox in a motor vehicle. The engine is connected to, in order to drive, the gearbox, wherein the speed of the engine is controlled by an accelerator pedal which is connected to the engine and gearbox and can assume a plurality of positions. A shift point is controlled by the accelerator pedal and represents an engine speed at which the gearbox effects a downshift or upshift. The system operates in a first mode in which the one or more shift points are controlled on the basis of movements of the accelerator pedal, and also applies a limitation upon the change in the one or more shift points per unit time. Also a method, a motor vehicle, a computer program and a computer program product for the system are disclosed.

19 Claims, 3 Drawing Sheets

(56) References Cited

U.S. PATENT DOCUMENTS

| | | | |
|---|---|---|---|
| 5,405,301 A * | 4/1995 | Yagi et al. | 477/120 |
| 5,688,207 A | 11/1997 | Uchida et al. | |
| 6,085,140 A | 7/2000 | Choi | |
| 6,456,919 B1 | 9/2002 | Körner et al. | |
| 2008/0097674 A1 | 4/2008 | Kuwahara et al. | |
| 2009/0192020 A1* | 7/2009 | Futamura et al. | 477/199 |
| 2009/0233765 A1* | 9/2009 | Tao et al. | 477/127 |
| 2009/0271081 A1* | 10/2009 | Watanabe et al. | 701/60 |
| 2010/0071987 A1* | 3/2010 | Hyodo et al. | 180/338 |

FOREIGN PATENT DOCUMENTS

| | | |
|---|---|---|
| EP | 0638742 A1 | 2/1995 |
| EP | 1342939 | 9/2003 |
| EP | 2 003 371 A2 | 12/2008 |
| WO | WO 97/29307 | 8/1997 |

OTHER PUBLICATIONS

English translation of Russian Office Action, dated May 21, 2013, issued in corresponding Russian Patent Application No. 2012114801/11 (022382), 5 pages.

* cited by examiner

SYSTEM FOR CONTROL OF GEARSHIFT POINTS

CROSS-REFERENCE TO RELATED APPLICATIONS

The present application is a 35 U.S.C. §§371 national phase conversion of PCT/SE2010/050959, filed Sep. 10, 2010, which claims priority of Swedish Application No.0950658-5, filed Sep. 14, 2009, the contents of which are incorporated by reference herein. The PCT International Application was published in the English language.

TECHNICAL FIELD

The present invention relates to a system for control of one or more gearshift points.

The invention further relates to a system, a motor vehicle, a computer program and a computer program product thereof which uses the system.

BACKGROUND TO THE INVENTION

FIG. 1 depicts schematically parts of a power train for a motor vehicle 1, such as a passenger car or a heavy vehicle, e.g. a truck or bus. The power train comprises an engine 10 mechanically connected by a shaft to a first end of a gearbox 20 via a clutch device 40. The gearbox 20 is also mechanically connected, at its other end, by a propeller shaft 50 to a differential gear 30 associated with a rear axle. The rear axle comprises respective left and right drive shafts 60 which drive the vehicle's powered wheels (not depicted in the diagram).

With this well-known arrangement, the mechanical work of the engine 10 is transmitted via various transmission devices (e.g. clutch device 40, gearbox 20, propeller shaft 50, differential gear 30 and drive shafts 60) to powered wheels in order to move the vehicle 1. An important device in the power train is the gearbox 20, which has a number of forward gears for moving the motor vehicle 1 forwards, and usually also one or more reverse gears. The number of forward gears varies but modern kinds of trucks are usually provided with twelve forward gears.

The gearbox 20 may be of manual or automatic type (automatic gearbox), but also of the automatic manual gearbox type (automatic manual transmission, AMT). Automatic gearboxes and automatic manual gearboxes are automated gearbox systems usually controlled by a control unit 110 (sometimes also called electronic control unit, ECU) which is adapted to controlling the gearbox 20, e.g. during gear changing, as when choosing gears at a certain vehicle speed with a certain running resistance. The ECU may measure engine speed and the state of the gearbox 20 and control the gearbox by means of solenoid valves connected to compressed air devices. Information about the engine 10, e.g. its speed and torque, is also sent from the engine 10 to the ECU, e.g. via a CAN (controller area network) bus.

In conventional gear change systems, the control unit 110 uses tabulated engine speed limits, also called shift points, which represent the engine speed at which a downshift or an upshift should be effected in the gearbox 20, i.e. the vehicle 1 changes gear when the speed of its engine 10 passes a speed represented by a shift point. The shift points may therefore be construed as providing information not only about when a downshift or an upshift should take place but also about the number of gear steps to be effected at each downshift or an upshift. It is usual for each shift point to comprise one to three gear steps, but more steps are possible.

FIG. 2 depicts schematically an example of various tabulated shift points represented by lines SP1-SP6 in a graph where the x axis represents engine torque and the y axis the speed of the engine 10 in revolutions per minute (rpm). So long as the engine speed is between shift lines SP1 and SP4 no gear change takes place, but if it rises above an upshift line, SP1-SP3, an upshift is initiated, and similarly a downshift is initiated if the engine speed drops below a downshift line, SP4-SP6. Table 1 below shows a number of upward or downward gear steps for each of the lines SP1-SP6. For example, an upshift by one step takes place if the engine speed rises above line SP1 and a downshift by two steps if the engine speed drops below line SP5.

TABLE 1

| Downshift and upshift lines SP1-SP6 | |
|---|---|
| SP1 | Engine speed for upshift by 1 step |
| SP2 | Engine speed for upshift by 2 steps |
| SP3 | Engine speed for upshift by 3 steps |
| SP4 | Engine speed for downshift by 1 step |
| SP5 | Engine speed for downshift by 2 steps |
| SP6 | Engine speed for downshift by 3 steps |

Shift point choices affect inter alia running characteristics, acceleration, comfort and fuel consumption for the vehicle 1, so shift points have to be accurately calibrated by vehicle manufacturers. This calibration involves various gearshift strategies being tested in the field in different driving situations, e.g. with different amounts of acceleration applied, different road gradients and different vehicle-combination weights. The test results have then to be thoroughly analysed to determine appropriate shift points.

For the driver to be able to affect the shift points, it is usual that the position of the accelerator pedal 2 controls the shift-point engine speeds. However, such a solution according to the state of the art results in gear changes being more frequent than desired if the position of the accelerator pedal 2 is continually changed because the shift-point engine speeds move up and down with changes in the position of the accelerator pedal 2. The vehicle 1 may then be felt to be "nervous" because of the frequent gear changes, and both fuel consumption and ride comfort may also be affected. FIG. 3 depicts an example of an accelerator pedal 2 in a vehicle 1 where the pedal can pivot about a spindle to control the acceleration applied/the engine torque, as illustrated by the dotted arrows in the diagram.

BRIEF DESCRIPTION OF THE INVENTION

An object of the present invention is to propose an alternative system for control of one or more shift points. Another object of the invention is to propose a system for control of one or more shift points which totally or partly solves the problems of the state of the art.

According to an aspect of the invention, the above objects are achieved with a system for controlling one or more shift points which comprises at least one control unit adapted to controlling a gearbox in a motor vehicle which comprises an engine connected to, in order to drive, the gearbox, where the speed of the engine is controlled by means of an accelerator pedal which is connected to the engine and gearbox and can assume a plurality of positions, a shift point is controlled by the accelerator pedal and represents an engine speed at which the gearbox is adapted to effecting a downshift or upshift,-and the system is adapted to operating in a first mode in which the one or more shift points are controlled on the basis of movements of the accelerator pedal, and is further adapted to applying a limitation upon the change in the one or more shift points per unit time.

The invention also relates also to a motor vehicle comprising at least one such system.

According to another aspect of the invention, the above objects are achieved with a method for controlling one or more shift points for a gearbox in a motor vehicle which comprises an engine connected to, in order to drive, the gearbox, where the speed of the engine is controlled by means of an accelerator pedal which is connected to the engine and gearbox and can assume a plurality of positions, and the one or more shift points are controlled by the accelerator pedal, each representing an engine speed at which the gearbox is adapted to effecting a downshift or an upshift, and are controlled on the basis of movements of the accelerator pedal in a first mode, thereby applying a limitation upon the change in the one or more shift points per unit time.

The invention relates also to computer program comprising a program code which, when said program code is executed in a computer, causes said computer to effect the above method. The invention relates also to a computer program product belonging to the computer program.

The method according to the invention may also be modified according to the various embodiments of the above system.

An advantage of the invention is that frequent gear changes are avoided, resulting in smoother running and hence also better ride comfort when the vehicle is in motion. Further advantages and applications of a device and a system according to the invention are indicated by the detailed description set out below.

BRIEF DESCRIPTION OF THE DRAWINGS

In the detailed description of the present invention set out below, embodiments of the invention are described with reference to the attached drawings, in which.

DETAILED DESCRIPTION OF THE INVENTION

Figure 1:
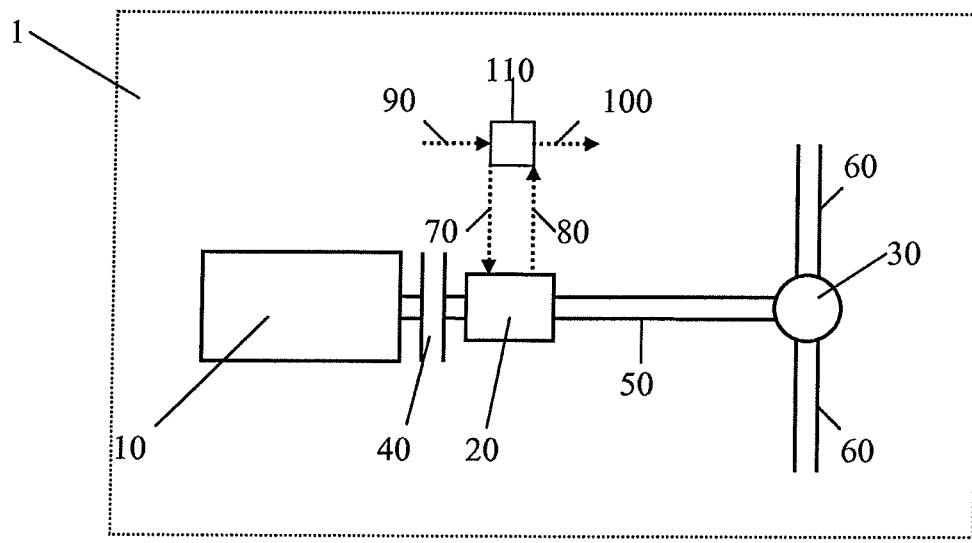
FIG. 1 depicts schematically part of a power train for a motor vehicle.
Figure 2:
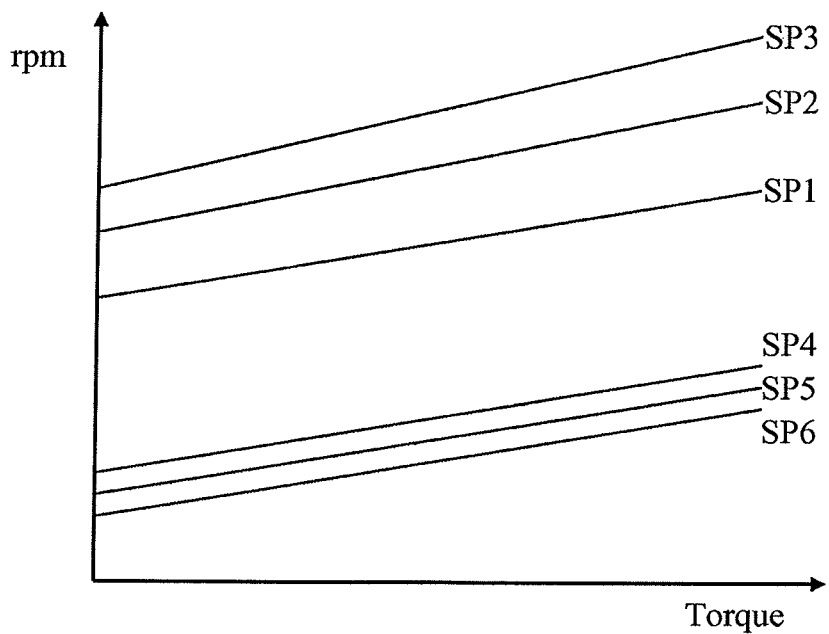
FIG. 2 is a graph of downshift and upshift lines.
Figure 3:
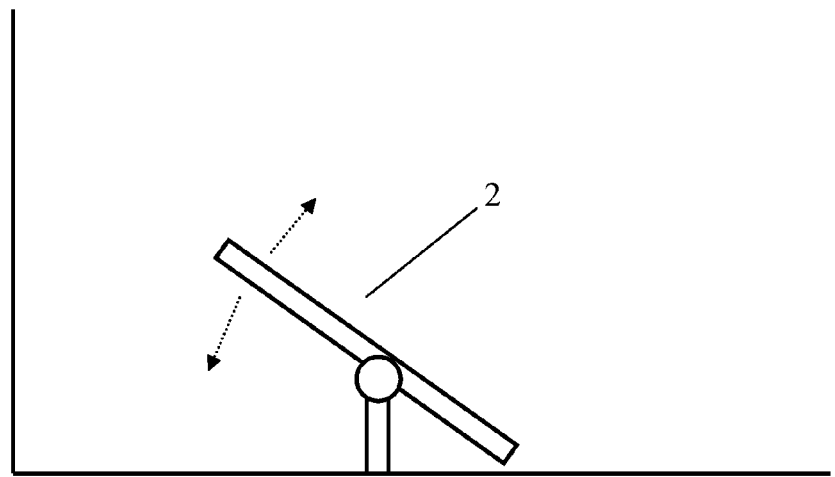
FIG. 3 depicts schematically an accelerator pedal.

According to the state of the art, the shift points are controlled by the position of the accelerator pedal 2, resulting in certain disadvantages as described above.

To wholly or partly eliminate these disadvantages, the invention therefore relates to a system comprising at least one control unit 110 for controlling one or more shift points on the basis of movements of an accelerator pedal 2. As the accelerator pedal 2 can assume a plurality of continuous positions between a first extreme position (corresponding to no acceleration applied) and a second extreme position (corresponding to full acceleration applied), the shift points are controlled by movements of the accelerator pedal 2 between these extreme positions. For example, one or more sensors or the like may register movements of the accelerator pedal 2 and send this information to a processor unit for use in controlling a gearbox 20.

The system is also adapted to operating in a first mode M1 in which the shift points are controlled on the basis of movements of the accelerator pedal 2, but changes in the shift points are subject to a limitation upon how far they may be moved. This limitation refers to how far the shift points may be moved in terms of engine speed per unit time. The advantage of such a solution is inter alia that it solves the previously mentioned problem of too frequent gear changes and hence results in smoother running and consequently better ride comfort when the vehicle 1 is in motion.

The limitation upon the change in the shift points is defined, according to an embodiment, as how much an engine speed for a shift point may be altered per second, and is preferably of the order of 1-500 rpm/s. The magnitude of the limitation may be a static parameter, e.g. it may be predetermined by the vehicle manufacturer, but according to an embodiment it is a dynamic parameter which may be varied, e.g. by a control device for the purpose, such as a mechanical control or an electronic control device. With a dynamic parameter the limitation upon the change in the shift points may be adjusted according to individual preferences.

The shift points may also be controlled on the basis of the derivative $\Delta$ for the position of the accelerator pedal 2, meaning in this case the time derivative of the change in the position of the accelerator pedal 2. For example, the derivative $\Delta$ may be calculated as the difference in the position of the accelerator pedal 2 per unit time. In the case of an accelerator pedal 2 whose first extreme position represents 0% and second extreme position 100%, the derivative $\Delta$ may be defined in percent per second.

According to another embodiment of the invention, the limitation upon the change in the shift points is effected by a low-pass filter and/or a multi-step limiter. The difference between them is that the low-pass filter is always subject to a certain time lag even during slow accelerator pedal movements, whereas the multi-step limiter does not affect the shift points with respect to time (time lag) if they move within the permitted limits. This limitation is preferably implemented in the control unit 110.

According to a further embodiment of the invention, the system is also adapted to operating in a second mode M2. When the system operates in this second mode M2, the aforesaid limitation upon the change in the shift points does not apply. This second mode M2 is preferably initiated when the derivative $\Delta$ for the position of the accelerator pedal 2 assumes a larger value than a first threshold value $\Delta_{T1}$, leading to the shift points accompanying movements of the accelerator pedal 2 without the limitation which applies to changes in the shift points when the system operates in said first mode M1.

The advantage of this embodiment is that the driver receives quick response to a quick depression of the accelerator pedal 2 in that the shift points in said second mode M2 then accompany the movements of the accelerator pedal 2 without limitation, e.g. in order to effect a rapid downshift. For the system to return from said second mode M2 to said first mode M1, the derivative $\Delta$ for the position of the accelerator pedal 2 may be compared with a second threshold value $\Delta_{T2}$. If the absolute amount of the derivative $\Delta$ for the position of the accelerator pedal 2 assumes a value smaller than the second threshold value $\Delta_{T2}$, the system reverts to operating in said first mode M1. In a version of the above embodiment, the first threshold value $\Delta_{T2}$ and the second threshold value $\Delta_{T2}$ are preferably the same value of the order of 100-300% per second. The first threshold value $\Delta_{T1}$ and the second threshold value $\Delta_{T2}$ may each be a predetermined value or a value determined in real time. This version therefore provides the driver with good control of the gear change behaviour of the vehicle 1.

It is also possible for the return from said second mode M2 to said first mode M1 to be effected by means of a timer so that the system automatically reverts from said second mode M2 to said first mode M1 when a time period T has passed since said second mode M2 was initiated.

Figure 4:
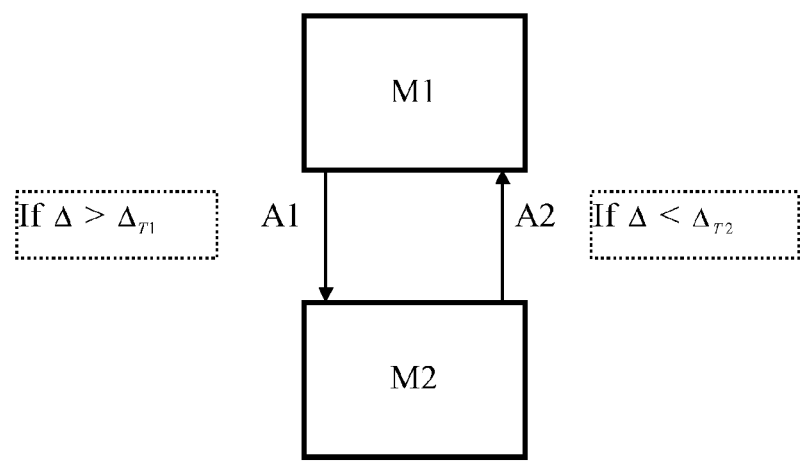
FIG. 4 is a state diagram of an embodiment of the invention.

FIG. 4 is a simplified state diagram of embodiments described above when the system is adapted to operating in the first mode M1 or the second mode M2. The change in the position of the accelerator pedal 2 is usually relatively small, so the system most often operates in the first mode M1. In this mode, if it is detected that the derivative Δ or the position of the accelerator pedal 2 assumes a larger value than the first threshold value $\Delta_{T1}$, the system switches to operating in the second mode M2, as illustrated by arrow A1. When the system is operating in the second mode M2, if the derivative Δ for the position of the accelerator pedal 2 assumes a smaller value than the second threshold value $\Delta_{T2}$, the system reverts to operating in the first mode M1, as illustrated by arrow A2 in FIG. 4. When the system returns to operating in the first mode M1, the second mode M2 may be initiated again upon fulfilment of the condition that the derivative Δ for the position of the accelerator pedal 2 assumes a larger value than the first threshold value $\Delta_{T1}$, and so on.

The gearbox 20 is preferably of the kind which forms part of an automated gear change system controlled by a control unit 110, e.g. an ECU. In such a system, gear changes are effected automatically by the control unit 110 but it is also usual for the driver to be able to execute manual gear changes in such a system, what is known as manual gear change in automatic state (automatic mode). The gearbox 20 also has a plurality of gears, e.g. twelve forward gears and one or more reverse gears are usual in modern trucks.

According to a further embodiment of the invention, an engine target speed $\omega_T$ is also controlled by movements of the accelerator pedal 2. The target speed $\omega_T$ may be construed as a desired speed for the engine 10 and may be determined on the basis of assumptions and knowledge about the mode of operation and performance of the engine 10. An engine 10 usually runs more efficiently and better at certain engine speeds than at others. Efficiently and better means less fuel consumption, lower vibration levels, quieter operation etc. The target speed $\omega_T$ may be within the range 500-2500 rpm, and preferably within the range 1000-1400 rpm for the engine 10.

Figure 5:
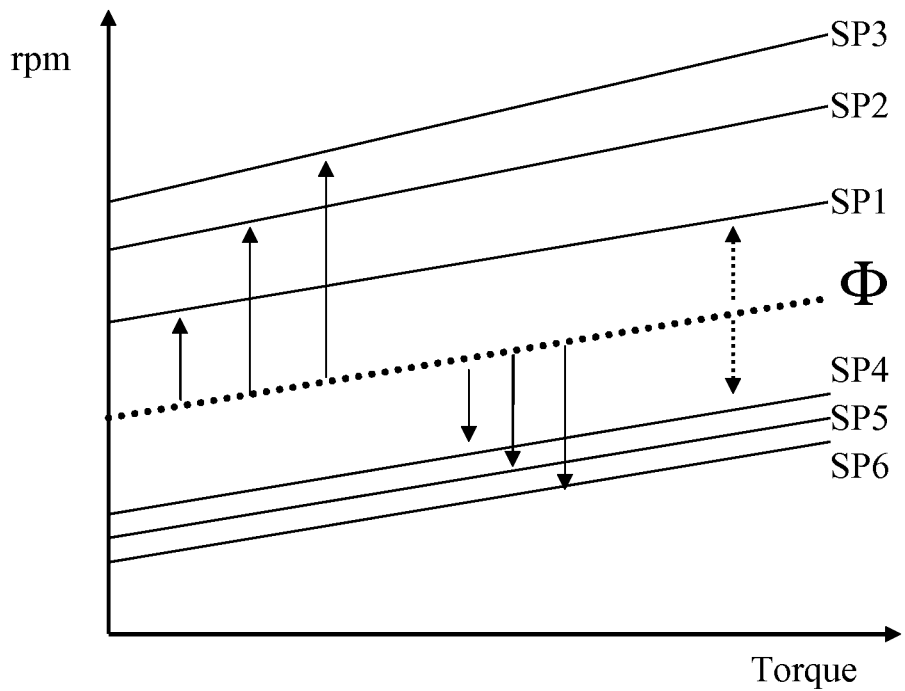
FIG. 5 depicts downshift and upshift lines related to an engine target speed line.

In a gear change system with an engine target speed $\omega_T$, downshift and upshift points are controlled relative to the target speed $\omega_T$, which means that the downshift and upshift points are determined on the basis of that speed. In FIG. 5 an engine target speed line Φ in the form of a dotted line appears between upshift lines SP1-SP3 and downshift lines SP4-SP6. Arrows in the diagram show how upshift lines SP1-SP3 and downshift lines SP4-SP6 are related to the target speed line Φ. This means that if the target speed line Φ is altered (by being moved upwards or downwards in parallel according to the dotted arrows) the engine speed for the shift lines SP1-SP6 will also move in parallel. The shift lines SP1-SP6 may for example accompany the target speed line Φ proportionally with a scale factor which may be different for upshift and downshift lines respectively but may also be the same, in which case an established mutual relationship between the upshift and downshift points is achieved. It is also possible to have an individual scale factor for each shift line SP1-SP6, i.e. certain shift lines SP1-SP6 may change more or less than other shift lines SP1-SP6 in response to the same change in the target speed line Φ.

The advantage of the shift points accompanying movements of the accelerator pedal 2 through control of an engine target speed $\omega_T$ is that the driver can intuitively and easily affect the way the vehicle 1 behaves. The limitation upon how quickly the shift points are allowed to change solves the problem of too frequent gear changes due to the driver moving the accelerator pedal 2, but the fact that the system can also operate in said second mode M2 means that rapid accelerator pedal movements remove this limitation (in said first mode M1), enabling the driver to decide for him/herself whether the vehicle 1 should change gear often or not, by adjusting how quickly he/she moves the accelerator pedal 2.

The invention relates also to a motor vehicle 1, e.g. a truck or bus, comprising at least one system as above.

The invention relates also to a method for control of shift points based on movement of an accelerator pedal 2. According to the method, the shift points are controlled on the basis of movements of the accelerator pedal 2 in a first mode Ml in which a limitation upon the change in shift points per unit time is applied. According to an embodiment of the method, shift points are controlled on the basis of the derivative Δ for the position of the accelerator pedal, and in a version of that embodiment the shift points may also be controlled in a second mode M2 in which the limitation does not apply. The second mode M2 is initiated if the derivative Δ for the position of the accelerator pedal 2 assumes a value larger than the first threshold value $\Delta_{T1}$. In addition, the shift points may, after having been controlled in the second mode M2, be again controlled in the first mode Ml if the absolute amount of the derivative Δ for the position of the accelerator pedal 2 assumes a smaller value than a second threshold value $\Delta_{T2}$. The method according to this embodiment therefore functions according to the previously described state diagram in FIG. 4.

It should be also be noted that the method and embodiments of the method above may be modified according to the various embodiments of a system for controlling a gearbox according to the invention.

Specialists will appreciate that a method for controlling one or more shift points according to the present invention might also be implemented in a computer program which, when executed in a computer, causes the computer to effect the method. The computer program is contained in a computer program product's computer-readable medium which takes the form of a suitable memory, e.g. ROM (read-only memory), PROM programable read-only memory), EPROM (erasable PROM), flash memory, EEPROM (electrically erasable PROM), hard disc unit, etc.

Figure 6:
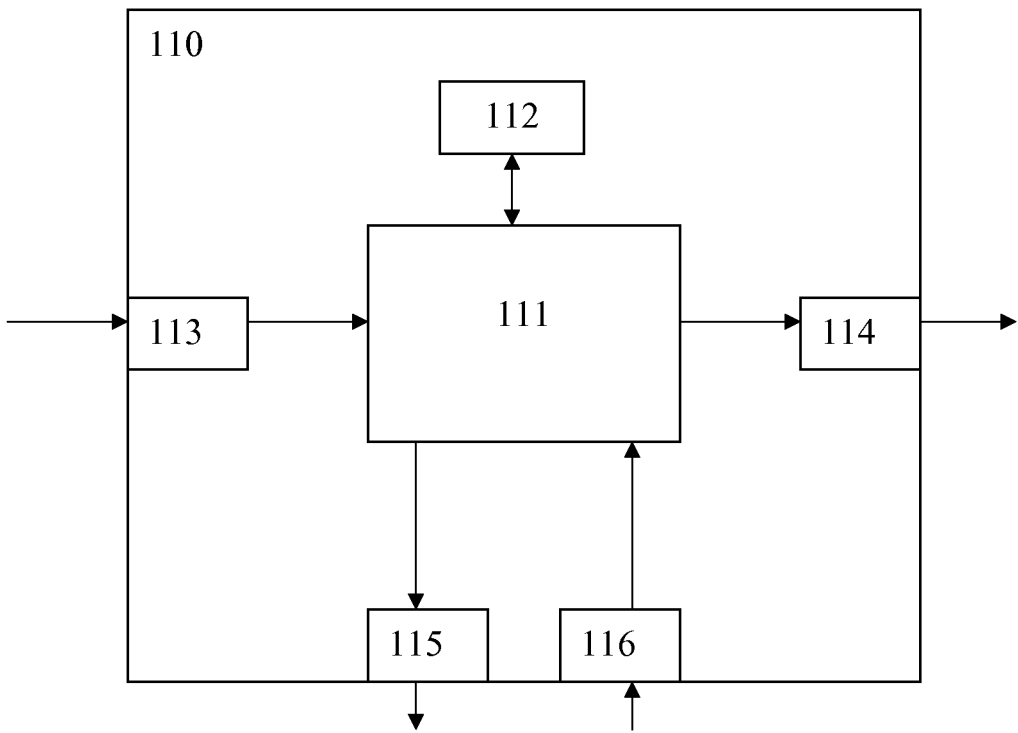
FIG. 6 depicts a control unit forming part of a system according to the invention.

FIG. 6 depicts schematically a control unit 110 forming part of a system according to the invention. The control unit 110 comprises a calculation unit 111 which may take the form of substantially any suitable type of processor or microcomputer, e.g. a circuit for digital signal processing (digital signal processor, DSP) or a circuit with a predetermined specific function (application specific integrated circuit, ASIC). The calculation unit 111 is connected to a memory unit 112 which is incorporated in the control unit 110 and which provides the calculation unit 111 with, for example, the stored program code and/or the stored data which the calculation unit 111 needs for it to be able to perform calculations. The calculation unit 111 is also adapted to storing partial or final results of calculations in the memory unit 112.

The control unit 110 is further provided with devices 113, 114, 115, 116 for respectively receiving input signals and sending output signals. These input and output signals may comprise waveforms, pulses or other attributes which the signal receiving devices 113, 116 can detect as information and which can be converted to signals which are processable by the calculation unit 111. The calculation unit 111 is then provided with these signals. The signal sending devices 114, 115 are adapted to converting signals received from the calculation unit 111 in order to create, eg by modulating the signals, output signals which can be transmitted to other parts of the system for determination of downshift and upshift points. One skilled in the art will appreciate that the aforesaid computer may take the form of the calculation unit 111 and that the aforesaid memory may take the form of the memory unit 112.

Each of the connections to the respective devices for respectively receiving input signals and sending output signals may take the form of one or more from among the following: cable, data bus, e.g. CAN (controller area network) bus, MOST (media orientated systems transport) bus or some other bus configuration, or a wireless connection. The connections 70, 80, 90, 100 in FIG. 1 may also take the form of one or more of these cables, buses or wireless connections.

Finally, the present invention is not limited to its embodiments described above, but relates to and comprises all embodiments within the scope of protection of the attached independent claims.

The invention claimed is:

1. A system for controlling one or more gearshift points in a gearbox of a motor vehicle comprising an engine, the gearbox, and an accelerator pedal connected to the engine and the gearbox and configured to assume a plurality of positions for controlling a speed of the engine, the system comprising:
 a control unit configured to control the gearbox, the one or more gearshift points for the gearbox are controlled on the basis of movements of the accelerator pedal and represent an engine speed at which the control unit causes the gearbox to effect a downshift or an upshift;
 a low-pass filter or a multi-stage limiter;
 the system is configured to operate in a first mode in which the one or more gearshift points are changed based on a movement of the accelerator pedal,
 wherein the low-pass filter or the multi-stage limiter limits the change in the one or more gearshift points per unit time.

2. A system according to claim 1, wherein the one or more gearshift points are controlled in the gearbox on a basis of a derivative for the position of the accelerator pedal.

3. A system according to claim 2, wherein the system is configured to operate in a second mode in which the limitation does not apply, and the second mode is initiated when the absolute amount of the derivative for the position of the accelerator pedal assumes a larger value than a first threshold value,
 wherein the first threshold value is a predetermined value or a value calculated in real time.

4. A system according to claim 3, wherein the system is configured and operable to return to the first mode after having operated in the second mode.

5. A system according to claim 4, wherein the system returns to the first mode from the second mode if the absolute amount of the derivative for the position of the accelerator pedal assumes a smaller value than a second threshold value,
 wherein the second threshold value is a predetermined value or a value calculated in real time.

6. A system according to claim 1, wherein the system defines the limitation in terms of engine speed per second and is in a range of 1-500 rpm/s.

7. A system according to claim 1, wherein an order of magnitude of the limitation may be varied dynamically.

8. A system according to claim 1, wherein the accelerator pedal is configured and operable to control an engine target speed, the engine target speed being a desired speed for the engine.

9. A system according to claim 1, wherein the gearbox is an automatic gearbox or an automated manual gearbox comprising a plurality of gears, and the motor vehicle is a truck or a bus.

10. A motor vehicle comprising at least one system according to claim 1.

11. A method of controlling one or more gearshift points for a gearbox in an engine of a motor vehicle, wherein the engine is connected to drive the gearbox, an accelerator pedal controls a speed of the engine connected to the engine and the gearbox and assumes a plurality of positions, the method comprising:
 controlling the one or more gearshift points based on movements of the accelerator pedal,
 wherein each gearshift point represents an engine speed at which the gearbox effects a downshift or an upshift;
 in a first mode, changing the one or more gearshift points based on a movement of the accelerator pedal; and
 limiting, using a low-pass filter or a multi-stage limiter, the change in the one or more gearshift points per unit time.

12. A method according to claim 11, further comprising controlling the one or more gearshift points on the basis of the derivative for the position of the accelerator pedal.

13. A method according to claim 11, further comprising:
 controlling the one or more gearshift points in a second mode in which the limitation does not apply; and
 initiating the second mode when the absolute amount of the derivative for the position of the accelerator pedal assumes a larger value than a first threshold value,
 wherein the first threshold value is a predetermined value or a value calculated in real time.

14. A method according to claim 13, further comprising:
 controlling the one or more gearshift points in the first mode after having been controlled in the second mode when the absolute amount of the derivative for the position of the accelerator pedal assumes a smaller value than a second threshold value,
 wherein the second threshold value is a predetermined value or a value calculated in real time.

15. A non-transitory computer-readable medium incorporating program code which, when said program code is executed non-transitory computer, causes the non-transitory computer to effect the method according to claim 11.

16. The non-transitory computer-readable medium according to claim 15, wherein the non-transitory computer-readable medium comprises at least one of ROM (read-only memory), PROM (programable ROM), EPROM (erasable PROM), flash memory, EEPROM (electrically erasable PROM) and hard disc unit.

17. A system for controlling one or more gearshift points in a gearbox of a motor vehicle comprising an engine, the gearbox, and an accelerator pedal connected to the engine and the gearbox and configured to assume a plurality of positions for controlling a speed of the engine, the system comprising:
 a control unit configured to control the gearbox, a gearshift point for the gearbox is controlled on the basis of movements of the accelerator pedal and represents an engine speed at which the control unit causes the gearbox to effect a downshift or an upshift;

the system is configured to operate in a first mode in which the one or more gearshift points are changed based on a movement of the accelerator pedal, wherein the change in the one or more gearshift points is limited per unit time, wherein the system is configured to operate in a second mode in which the limitation of the change of the one or more gearshift points is not applied, and the second mode is initiated when an absolute amount of a derivative for the position of the accelerator pedal assumes a larger value than a first threshold value, wherein the first threshold value is a predetermined value or a value calculated in real time.

18. A system according to claim 17, wherein the system is configured and operable to return to the first mode after having operated in the second mode.

19. A system according to claim 18, wherein the system returns to the first mode from the second mode when the absolute value of the derivative of the position of the accelerator pedal is smaller than a second threshold value, wherein the second threshold value is a predetermined value or a value calculated in real time.

* * * * *